United States Patent [19]

Knickerbocker et al.

[11] 4,384,172
[45] May 17, 1983

[54] TELEPHONE EQUIPMENT DISTRIBUTION PANEL STAND

[75] Inventors: Robert H. Knickerbocker, Chesire; Karl-Heinz Pohl, Woodbury, both of Conn.

[73] Assignee: The Siemon Company, Watertown, Conn.

[21] Appl. No.: 267,873

[22] Filed: May 28, 1981

[51] Int. Cl.³ .............................................. H04Q 1/14
[52] U.S. Cl. ..................................... 179/98; 211/189; 248/174; 361/429
[58] Field of Search ................ 179/91 R, 98; 211/26, 211/163, 189; 248/174, 450; 361/332, 334, 346, 427, 429; 40/610; 339/125 R; 52/458; 312/263

[56] References Cited

U.S. PATENT DOCUMENTS 2,975,227  3/1961  Wiater et al. ...................... 52/458 X
3,822,924  7/1974  Lust ................................. 312/263 X
3,846,590  11/1974  McLain .............................. 179/98
4,150,867  4/1979  Knickerbocker ........... 339/125 R X
4,155,131  5/1979  Harris et al. ..................... 312/263 X

FOREIGN PATENT DOCUMENTS 2730905   1/1979   Fed. Rep. of Germany ........ 40/610
2448239  10/1980   France .............................. 361/429
152454   11/1955   Sweden ............................ 312/263

Primary Examiner—G. Z. Rubinson
Assistant Examiner—Keith E. George
Attorney, Agent, or Firm—David S. Fishman

[57] ABSTRACT

A telephonic distribution panel assembly is comprised of three identical panels which are removably attached to one another. These three identical panels are arranged to form a three sided frame. The assembly provides easy access to various types of telephonic equipment which may be mounted to the frame.

4 Claims, 3 Drawing Figures

U.S. Patent     May 17, 1983     4,384,172
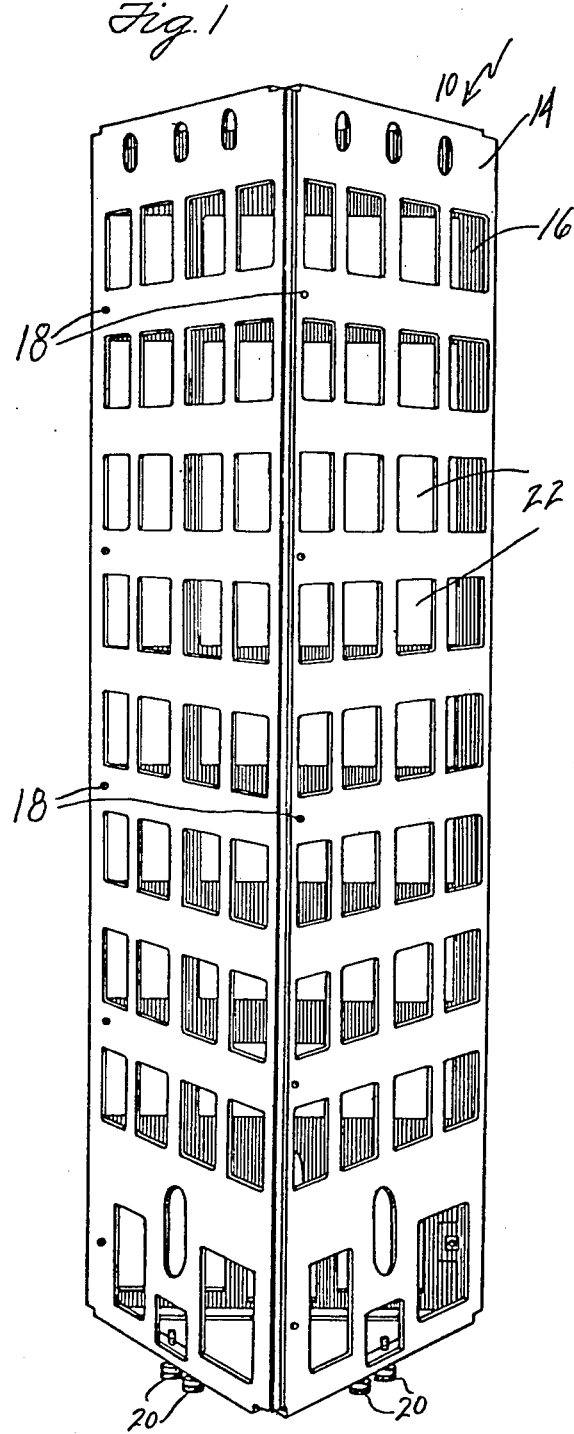
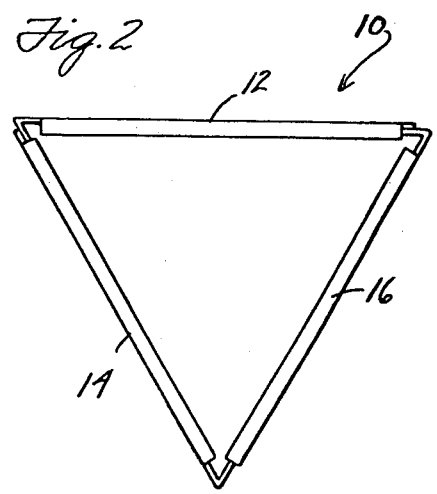
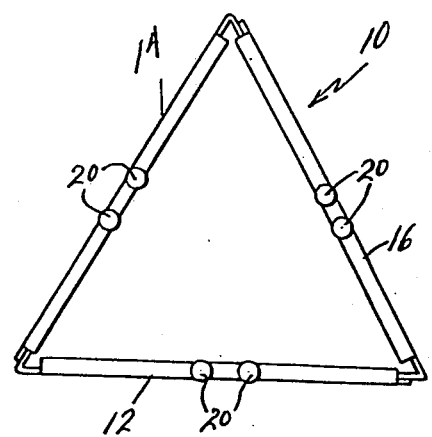

TELEPHONE EQUIPMENT DISTRIBUTION PANEL STAND

BACKGROUND OF THE INVENTION

1. Field of the Invention

This invention relates to a telephonic equipment distribution panel assembly. Specifically, the present invention is directed to a three sided frame which is comprised of three identical panels secured to one another.

2. Description of the Prior Art

It is common practice in office buildings having a large number of individual telephones scattered throughout the building to have a number of distribution panels in the building. The distribution panels are often mounted on a wall in a small room or closet on each floor of the office building. A number of telephone electronic instruments, i.e., terminal connecting blocks, are mounted on the panels. It is frequently necessary for telephone workmen to connect new telephones to or disconnect telephones from the panels and perform various other functions with respect to these panels. Accordingly, it is essential that the panels be readily accessible. Moreover, since space is at a premium in office buildings, it is desirable to fit a maximum amount of telephone equipment in a minimum amount of space.

SUMMARY OF THE PRESENT INVENTION

The present invention is an improvement upon the assembly disclosed in U.S. Pat. No. 3,846,590 which was issued Nov. 5, 1974 and is incorporated herein by reference. The assembly disclosed by the incorporated patent generally comprises a center post which has three panels mounted around it. While this assembly provided a unique structure from which terminal connecting blocks could be mounted it requires the manufacture of a stand assembly of a center post having radial arms mounted around the post. The three panels would then be attached to these radial arms. The present invention provides an assembly which is easily assembled and reduces the number of parts needed to construct the assembly. In accordance with the present invention a telephonic equipment distribution panel assembly is comprised of three identical panels bolted together. These three identical panels are generally planar with interlocking edges. This allows the assembly to be transported to the site in a collapsed form and then erected for use. It is further preferable to provide cutouts within each panel to allow easy mounting of telephonic electrical equipment, i.e., terminal connecting blocks.

BRIEF DESCRIPTION OF THE DRAWING

The present invention may be better understood and its numerous objects and advantages will become apparent to those skilled in the art by reference to the accompanying drawing wherein like reference numerals refer to like elements in the several Figures, and wherein:

FIG. 1 is a side perspective view of an assembly in accordance with the preferred embodiment of the present invention;

FIG. 2 is a top view of the assembly of FIG. 1; and

FIG. 3 is a bottom view of the assembly shown in FIG. 1.

DESCRIPTION OF THE PREFERRED EMBODIMENT

Referring more particularly to the drawings, a telephonic equipment distribution panel assembly is seen generally at 10. Frame 10 is comprised of three identical panels 12, 14 and 16 which are secured together along their edges. In order to allow coupling the panels 12, 14 and 16 are provided with interlocking side edges. As best seen in FIGS. 2 and 3 these interlocking side edges are preferably formed by angling one of the panel's side edges to approximately 60°. This angled side edge of the panel may then be attached to the generally planar edge of another panel by a series of bolts 18. It is further preferable to bend the top and bottom edges of each panel to approximately a 90° angle, as best seen in FIGS. 2 and 3.

The fully constructed assembly 10 may either stand directly upon the bent ends of the three panels or preferably a number of legs 20 may be mounted to the panels' 12, 14 and 16 ends, as seen in FIGS. 1 and 3. These legs 20 may preferably be made adjustable by threadably mounting them through the bent end edges of the panels. In this fashion the assembly 10 may be adjustably leveled on an uneven surface.

It is further preferable to provide the individual panels 12, 14 and 16 with an arrangement of apertures. As seen in FIG. 1, each panel is provided with eight linear rows of four apertures 22 of equal size and are provided with at least three oval apertures at their upper end and an arrangement of other apertures at their lower end. This arrangement provides cross pieces to which telephonic electric equipment may be mounted. A typical type of equipment which can be mounted to these cross members are the mounting brackets and terminal connecting blocks disclosed in U.S. Pat. No. 4,150,867, the disclosure of which is incorporated herein by reference. The apertures which are provided within the panels allow easy access to electrical cables which may be positioned within assembly 10 and also allow easy access to the backs of the various electronic equipment mounted upon the panels 12, 14 and 16. Furthermore, the apertures, particularly those along the bottom end of the panels, allow various electronic cables to be run into the assembly 10.

The individual panels 12, 14 and 16 are preferably made of metal, but other materials, such as, wood or plastic are suitable. These individual panels 12, 14 and 16 are preferably manufactured from a piece of sheet metal having the desired dimensions with the appropriate apertures being stamped out. Since the individual panels are identical the manufacture of the assembly 10 would be easier and less time consuming than the assembly disclosed in the referenced two patents. Furthermore, two panels may be directly mounted upon a wall, not shown, to provide a two sided mounting assembly. It is thus apparent that the identical panels can be arranged in differing shapes by modifying the interconnecting arrangement. This may easily be accomplished by varying the angular relationship of the side edge of each panel.

While the preferred embodiments have been shown and described, various modifications and substitutions may be made thereto without departing from the spirit and scope of the invention. Accordingly, it is to be understood that the present invention has been described by way of illustration and not limitation.

What is claimed is:

1. A telephonic distribution panel assembly comprising:
   at least three panels, said panels being generally identical, rectangular and planar, each of said panels having a first flat side edge and a second side edge extending rearwardly of the panel at a predetermined angle, the first edge of each panel being releasably interlocked to the second edge of an adjacent panel to define a free-standing stand of interlocked panels, and each of said panels being provided with an array of apertures.

2. The telephonic distribution panel of claim 1 wherein one of said second edge of each panel extends rearwardly of the panel at an angle of approximately 60° to said panel, three of said panels being releasably secured together to form a triangular assembly of said panels.

3. The telephonic distribution panel of claim 1 or 2 including:
   top and bottom edges extending from said panels at approximately 90°.

4. The telephonic distribution panel of claim 1 or 2 including:
   top and bottom edges extending from said panels at approximately 90°; and
   adjustable leg means connected to each bottom edge.

* * * * *